United States Patent
Ueda et al.

(10) Patent No.: US 9,180,790 B2
(45) Date of Patent: Nov. 10, 2015

(54) DC FEEDER VOLTAGE CONTROL APPARATUS AND DC FEEDER VOLTAGE CONTROL SYSTEM

(71) Applicants: Kenji Ueda, Tokyo (JP); Toshihiro Wada, Tokyo (JP); Yasushi Matsumura, Tokyo (JP); Satoru Takahashi, Tokyo (JP); Toshiyuki Katsurayama, Tokyo (JP)

(72) Inventors: Kenji Ueda, Tokyo (JP); Toshihiro Wada, Tokyo (JP); Yasushi Matsumura, Tokyo (JP); Satoru Takahashi, Tokyo (JP); Toshiyuki Katsurayama, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/373,781
(22) PCT Filed: Dec. 6, 2012
(86) PCT No.: PCT/JP2012/081685
§ 371 (c)(1),
(2) Date: Jul. 22, 2014
(87) PCT Pub. No.: WO2013/125130
PCT Pub. Date: Aug. 29, 2013

(65) Prior Publication Data
US 2015/0027838 A1    Jan. 29, 2015

(30) Foreign Application Priority Data
Feb. 22, 2012    (JP) .................. 2012-036600

(51) Int. Cl.
G05D 1/00    (2006.01)
B60M 3/02    (2006.01)
H02J 1/00    (2006.01)
(52) U.S. Cl.
CPC ... B60M 3/02 (2013.01); H02J 1/00 (2013.01)

(58) Field of Classification Search
CPC .......... B60M 3/02; B60L 2200/26; H02J 1/00
USPC .................................. 701/19; 191/6
See application file for complete search history.

(56) References Cited

U.S. PATENT DOCUMENTS

| 8,831,801 | B1 * | 9/2014 | Raghunathan et al. ......... 701/19 |
| 2011/0144831 | A1 | 6/2011 | Hata |
| 2014/0152087 | A1 * | 6/2014 | Nakatsuka et al. ............ 307/9.1 |

FOREIGN PATENT DOCUMENTS

| JP | 61 278436 | 12/1986 |
| JP | 7 304353 | 11/1995 |

(Continued)

OTHER PUBLICATIONS

International Search Report Issued Jan. 15, 2013 in PCT/JP12/081685 Filed Dec. 6, 2012.

Primary Examiner — Thomas G Black
Assistant Examiner — Luke Huynh
(74) Attorney, Agent, or Firm — Oblon, McClelland, Maier & Neustadt, L.L.P.

(57) ABSTRACT

A DC feeder voltage control apparatus includes a model-information storing unit storing train model information on each train running in a control section, substation model information on each substation, and feeding network model information in the control section, a fixed-voltage-value storing unit storing a fixed voltage value of a substation voltage set for each substation, a train-operation-state-information acquiring unit acquiring positions and operation state information on the trains running in the control section, a first-substation-voltage fixing unit outputting the fixed voltage value to two first substations located at both ends of the control section, and a second-substation-voltage calculating unit calculating a setting voltage value of the substation voltage in at least one second substation located between the two first substations based on the information, and substation voltages and substation currents of the first substations to output to the second substation.

14 Claims, 11 Drawing Sheets

(56) References Cited

FOREIGN PATENT DOCUMENTS

| JP | 8 314987 | 11/1996 |
| JP | 11 11185 | 1/1999 |
| JP | 11 91414 | 4/1999 |
| JP | 2002 234365 | 8/2002 |
| JP | 2007 20370 | 1/2007 |
| JP | 2008 24206 | 2/2008 |
| JP | 2011 31803 | 2/2011 |
| JP | 2011 121377 | 6/2011 |
| WO | 2010 026786 | 3/2010 |

* cited by examiner

… … …

DC FEEDER VOLTAGE CONTROL APPARATUS AND DC FEEDER VOLTAGE CONTROL SYSTEM

FIELD

The present invention relates to a DC feeder voltage control apparatus and a DC feeder voltage control system that control a DC feeder voltage of a railway substation.

BACKGROUND

In recent years, researches and developments have been actively performed for effectively utilizing regenerative power generated by a regenerative brake provided in a train for the purpose of energy saving and the like.

As a technology for effectively utilizing regenerative power in a direct-current electrified section, for example, there has been disclosed a technique for grasping, with the train-state grasping unit, an on-rail state and an operation state of a power running train and a regeneration train, determining, under a constraint set by the constraint setting unit, feeding sharing of each substation for optimizing an evaluation function set by the evaluation-function setting unit by using the optimum-feeding-sharing determining unit, and setting, with the transmission-voltage setting unit, transmission voltage values to rectifiers of the substations on the basis of the feeding sharing (e.g., Patent Literature 1).

CITATION LIST

Patent Literature

Patent Literature 1: Japanese Patent Application Laid-Open No. H7-304353

SUMMARY

Technical Problem

However, in the related art described above, although voltages of all the substations do not need to be adjustable, even when voltages of part of the substations are adjusted, it is necessary to grasp the states of all the trains present on a route and a feeding network. Therefore, there is a problem in that it is difficult to apply the technology when a large number of trains are present on the route and the feeding network, for example, when the feeding network extends across a plurality of routes or when a mutual operation of trains is performed between train companies.

The present invention has been devised in view of the above and it is an object of the present invention to provide a DC feeder voltage control apparatus capable of effectively utilizing regenerative power irrespective of the sizes of a route and a feeding network.

Solution to Problem

In order to solve the above problems and achieve the object, the present invention relates to a DC feeder voltage control apparatus that controls a substation voltage, which is a voltage at a connection point to an overhead wire, in substations in a predetermined control section in a direct-current electrified section of an electric railway, including a model-information storing unit that stores train model information on each of trains running in the control section, substation model information on each of the substations, and feeding network model information in the control section; a fixed-voltage-value storing unit that stores a fixed voltage value of the substation voltage set for each of the substations; a train-operation-state-information acquiring unit that acquires a position of each of the trains running in the control section and operation state information on each of the trains including information concerning whether the trains are in power-running or in regeneration; a first-substation-voltage fixing unit that outputs the fixed voltage value to each of two first substations located at both ends of the control section; and a second-substation-voltage calculating unit that calculates a setting voltage value of the substation voltage in at least one second substation located between the two first substations on a basis of the train model information, the substation model information, the feeding network model information, the operation state information, the substation voltages of the first substations, and substation currents flowing out to an overhead wire from the first substations, and outputs the setting voltage value to the second substation.

Advantageous Effects of Invention

According to the present invention, there is an effect that it is possible to effectively utilize regenerative power irrespective of the sizes of a route and a feeding network.

DESCRIPTION OF EMBODIMENTS

DC feeder voltage control apparatuses and DC feeder voltage control systems according to embodiments of the present invention are explained below with reference to the accompanying drawings. Note that the present invention is not limited by the embodiments explained below.

First Embodiment

Figure 1:
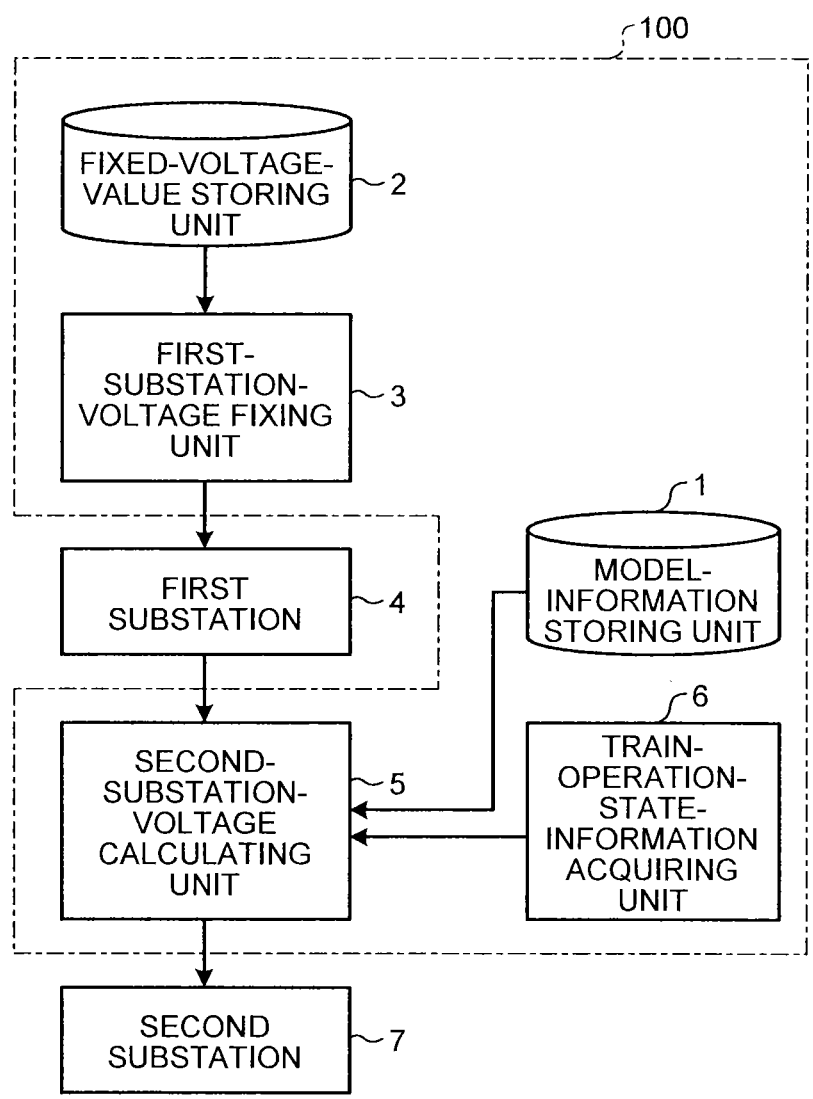
FIG. 1 is a diagram of a configuration example of a DC feeder voltage control apparatus according to a first embodiment.

FIG. 1 is a diagram of a configuration example of a DC feeder voltage control apparatus according to a first embodiment. As shown in FIG. 1, a DC feeder voltage control apparatus 100 according to the first embodiment includes a model-information storing unit 1, a fixed-voltage-value storing unit 2, a first-substation-voltage fixing unit 3, a train-operation-state-information acquiring unit 6, and a second-substation-voltage calculating unit 5. Note that, in the example shown in FIG. 1, the model-information storing unit 1 and the fixed-voltage-value storing unit 2 are different components. However, it is also possible to integrate functions of the model-information storing unit 1 and the fixed-voltage-value storing unit 2 and provide any one of the model-information storing unit 1 and the fixed-voltage-value storing unit 2.

Figure 2:
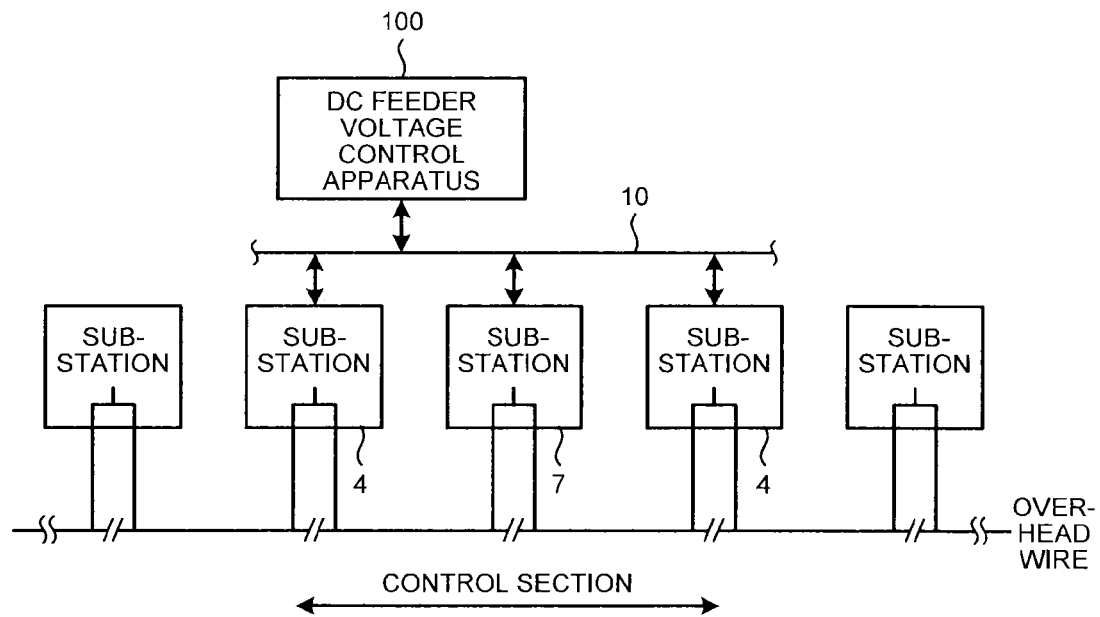
FIG. 2 is a diagram of a configuration example of a DC feeder voltage control system according to the first embodiment.
Figure 3:
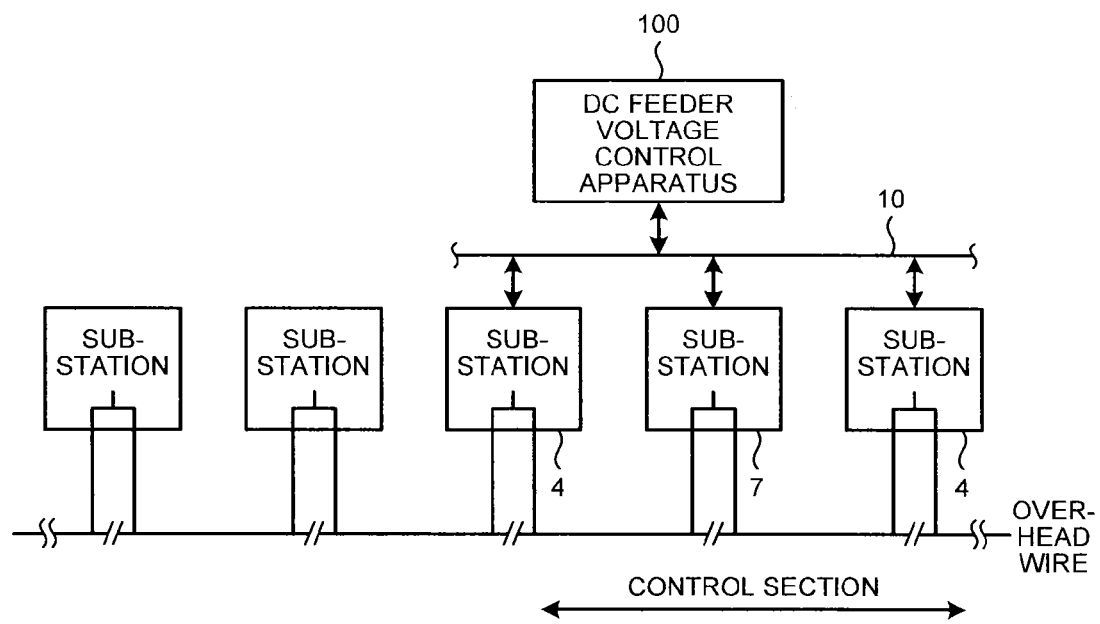
FIG. 3 is a diagram of another configuration example of the DC feeder voltage control system according to the first embodiment.

FIG. 2 is a diagram of a configuration example of a DC feeder voltage control system according to the first embodiment. FIG. 3 is a diagram of another configuration example of the DC feeder voltage control system according to the first embodiment. The DC feeder voltage control apparatus 100 according to the first embodiment sets, in a direct-current electrified section of an electric railway, a section between predetermined two substations, between which at least one substation is located, as a control section. As shown in FIG. 2 and FIG. 3, in the DC feeder voltage control system according to the first embodiment, two substations located at both ends of the control section are first substations 4. A substation located between the two first substations 4 is a second substation 7. The DC feeder voltage control system includes the DC feeder voltage control apparatus 100, the first substations 4, and the second substation 7. The DC feeder voltage control apparatus 100 is arranged in, for example, a control center (not shown in the figures) and connected to the first substations 4 and the second substation 7 via a network 10, such as a LAN. In an example shown in FIG. 2, a section between the two first substations 4 in the direct-current electrified section is a control section. In an example shown in FIG. 3, a section between the first substation 4 at an overhead wire terminal end in the direct-current electrified section and the first substation 4 in the direct-current electrified section is a control section. A plurality of the DC feeder voltage control systems according to the first embodiment are configured in the entire direct-current electrified section or part of the direct-current electrified section such that the control sections of the DC feeder voltage control systems do not overlap each other. In the examples shown in FIG. 2 and FIG. 3, one second substation 7 is provided. However, the number of the second substations 7 is not limited to this and can be two or more.

A concept of the DC feeder voltage control in the DC feeder voltage control apparatus 100 according to the present embodiment is explained.

A train running in the direct-current electrified section performs power regeneration with a regenerative brake in braking of the train. The train that is performing the power regeneration is hereinafter referred to as "regenerative train". Regenerative power generated by the regenerative train is supplied to, through an overhead wire, a train that is performing power running. The train that is performing the power running is hereinafter referred to as "power running train".

Figure 4:
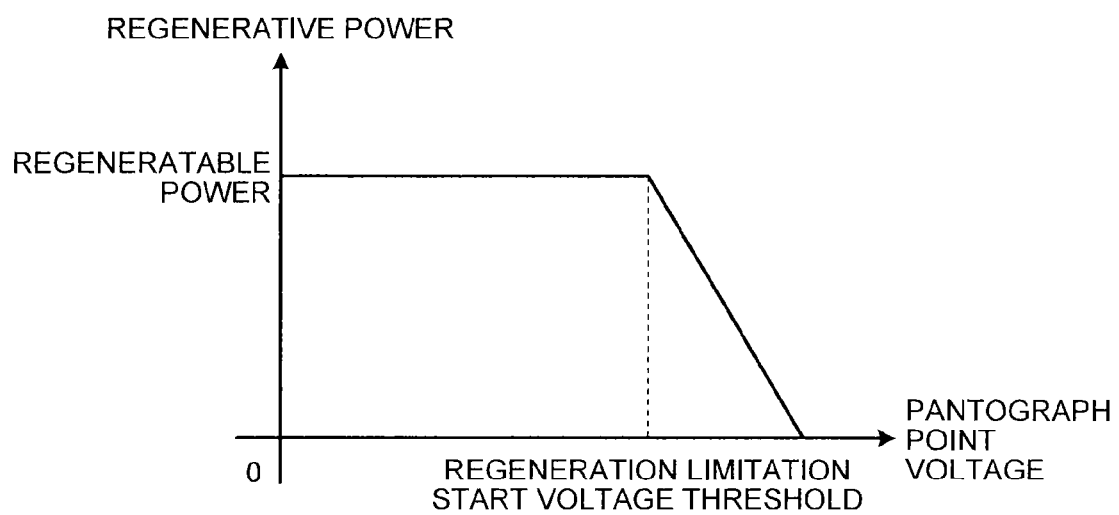
FIG. 4 is a diagram of an example of regeneration limiting control in a regeneration train.

FIG. 4 is a diagram of an example of regeneration limiting control in the regenerative train. In FIG. 4, the horizontal axis indicates a voltage (a pantograph point voltage) at a point where a pantograph of the regenerative train is in contact with the overhead wire and the vertical axis indicates the generative power. When the regenerative train supplies the regenerative power to the overhead wire, the pantograph point voltage rises. At this point, when the number of power running trains is small with respect to the amount of regenerative power, the regenerative power is excessively supplied and the overhead wire voltage becomes excessively large. To avoid this situation, as shown in FIG. 4, in a region where the pantograph point voltage is lower than the regeneration limitation start voltage threshold shown in the figure, all the regeneratable power regeneratable by the regenerative train is supplied to the overhead wire. However, in a region where the pantograph point voltage is equal to or higher than the regeneration limitation start voltage threshold, control for reducing the regenerative power is performed. The control for reducing the regenerative power is referred to as regeneration limiting control. Note that, in general, in a direct-current electrified section of a 1500V system, the regeneration limitation start voltage threshold is set to, for example, about 1650 volts to about 1780 volts. The regeneration limiting control is performed with an upper limit voltage value set to, for example, about 1700 volts to about 1800 volts.

When the regeneration limiting control is carried out, actually, the regeneratable power is wastefully consumed in the regenerative train and thus the regeneratable power cannot be effectively utilized. To effectively utilize the regeneratable power by the regenerative train, it is necessary to carry out control for dynamically changing a substation voltage, which is a voltage at connection points of the substations and the overhead wire. However, when all the substations in the direct-current electrified section are control targets, it is necessary to grasp the positions of all the trains present on a route and a feeding network, the states (power running or regeneration) of the trains, and the like. Therefore, it is difficult to apply the control when the number of trains present on the route and the feeding network is large, for example, when the feeding network extends across a plurality of routes or when a mutual operation of trains is performed between train companies. Further, when a specific section is set and the substations are controlled using the states of only the trains in the section, if a voltage is increased to supply electric power to the power running train in the section, when the regenerative train is present outside the section, it is likely that the overhead wire voltage rises, the regeneration limiting control is performed, and thus the regenerative power cannot be effectively utilized. If the voltage of the substations is lowered to effectively utilize the regenerative power of the regenerative train in the section, when the power running train is present outside the section, it is likely that the overhead wire voltage falls more than expected and electric power cannot be supplied to the power running train.

Therefore, in the present embodiment, a section between predetermined two substations, between which at least one substation is located, is set as a control section. The substation voltages of the first substations 4 at both ends of the control section are controlled such that they are each fixed. The substation voltage of the second substation 7 between the first substations 4 is controlled such that it is dynamically changed. Consequently, it is possible to perform control using only the positions of the trains present in the control section, the states of the trains, and the like without being affected by the positions, states, and the like of the trains present outside the control section. It is possible to effectively utilize the regenerative power irrespective of the sizes of the route and the feeding network.

Here the description refers back to FIG. 1. The components in the DC feeder voltage control apparatus 100 according to the present embodiment are explained.

The model-information storing unit 1 stores train model information on each of the trains running in the control section, substation model information on each of the substations in the control section, and feeding network model information on the control section. The train model information includes, for example, regeneration limitation start voltage thresholds and gradients of the regeneration limitation of the trains. The substation model information includes, for example, internal resistances and maximums of the substation voltages of the substations. The feeding network model information includes, for example, information indicating a connection state between the overhead wires or between the overhead wire and the substations, the length of the overhead wire, and the resistance ratio.

The fixed-voltage-value storing unit 2 stores a fixed voltage value of a substation voltage set for each of the substations in the control section. The fixed voltage value is a predetermined value set in advance for each of the substations. However, the fixed voltage value can be, for example, a value standardized in the substations in the control section.

The first-substation-voltage fixing unit 3 outputs the fixed voltage values stored in the fixed-voltage-value storing unit 2 to the first substations 4. The first substations 4 control the substation voltages such that they are fixed at the fixed voltage values output from the first-substation-voltage fixing unit 3. Note that, in the substation in which the normal rectifier is used as described in Patent Literature 1, according to the internal resistance peculiar to the substation, the substation voltage changes depending on the magnitude of the substation current, which is an electric current flowing out from the substation to the overhead wire. The substation voltage further falls as a substation current increases. Therefore, the substation voltage cannot be fixed. Therefore, in the present embodiment, the first substations 4 and the second substation 7 need to be substations in which thyristor elements and pulse width modulation (PWM) control capable of controlling the substation voltages such that they are fixed voltage values irrespective of substation currents are used.

Figure 9:
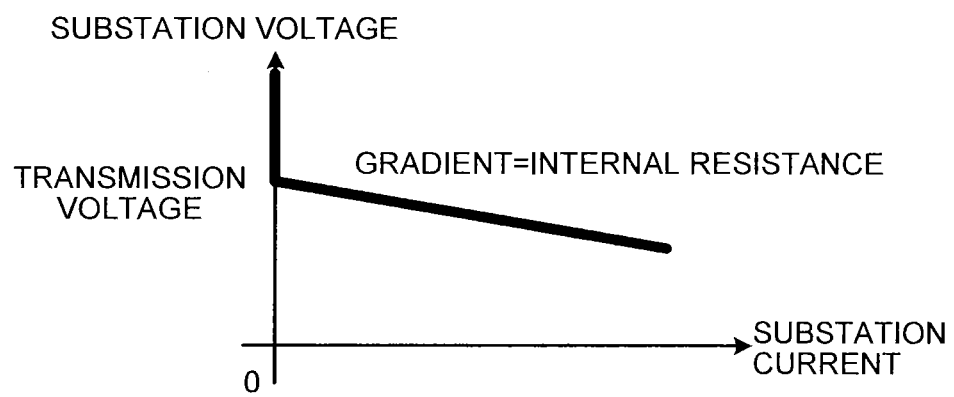
FIG. 9 is a diagram of an example of a current-voltage characteristic of a substation in which a rectifier is used.
Figure 10:
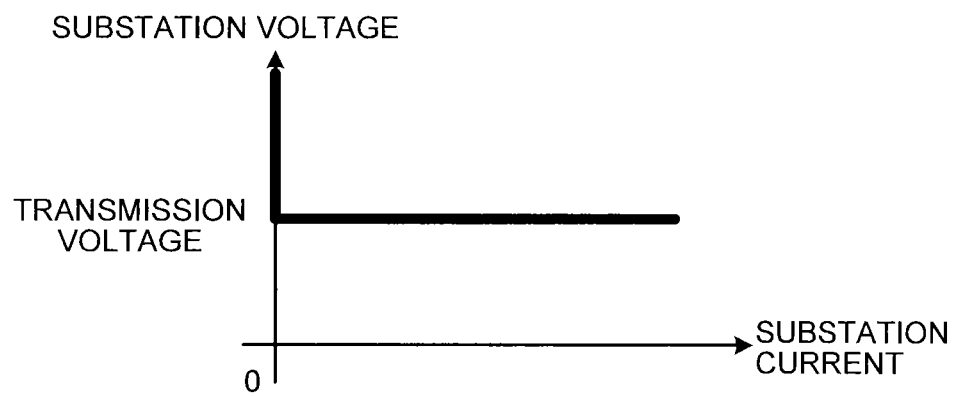
FIG. 10 is a diagram of an example of a current-voltage characteristic obtained when a substation voltage is fixed by a substation in which a thyristor element and PWM control are used.

FIG. 9 is a current-voltage characteristic of the substation in which the rectifier is used. FIG. 10 is a current-voltage characteristic obtained when the substation voltage is fixed by the substation in which the thyristor element and the PWM control are used. In both of FIG. 9 and FIG. 10, the horizontal axis indicates the substation current and the vertical axis indicates the substation voltage. As shown in FIG. 9, in the substation in which the rectifier is used, the transmission voltage decreases as the substation current increases. However, as shown in FIG. 10, in the substation in which the thyristor element and the PWM control are used, it is possible to control the transmission voltage such that it is fixed irrespective of the magnitude of the substation current.

The train-operation-state-information acquiring unit 6 acquires the positions of the trains running in the control section and operation state information including the operation states of the trains including information concerning whether the trains are in power-running or in regeneration. The train-operation-state-information acquiring unit 6 can acquire the operation state information from, for example, other systems, such as a train service management system and a train information management system, or can directly acquire the operation state information through radio communication or the like from the trains running in the control section. The present invention is not limited by these methods of acquiring the operation state information.

The second-substation-voltage calculating unit 5 calculates a setting voltage value of a substation voltage in the second substation 7 on the basis of the train model information, the substation model information, and the feeding network model information stored in the model-information storing unit 1, the operation state information acquired by the train-operation-state-information acquiring unit 6, and the substation voltages and the substation currents of the first substations 4, and outputs the setting voltage value to the second substation 7. The second substation 7 controls the substation voltage such that it becomes the setting voltage value output from the second-substation-voltage calculating unit 5. Note that, concerning a method of calculating the setting voltage value of the substation voltage of the second substation 7, the setting voltage value can be calculated by a known calculation method using the various kinds of information explained above. The present invention is not limited by the method of calculating the setting voltage value of the substation voltage.

Figure 5:
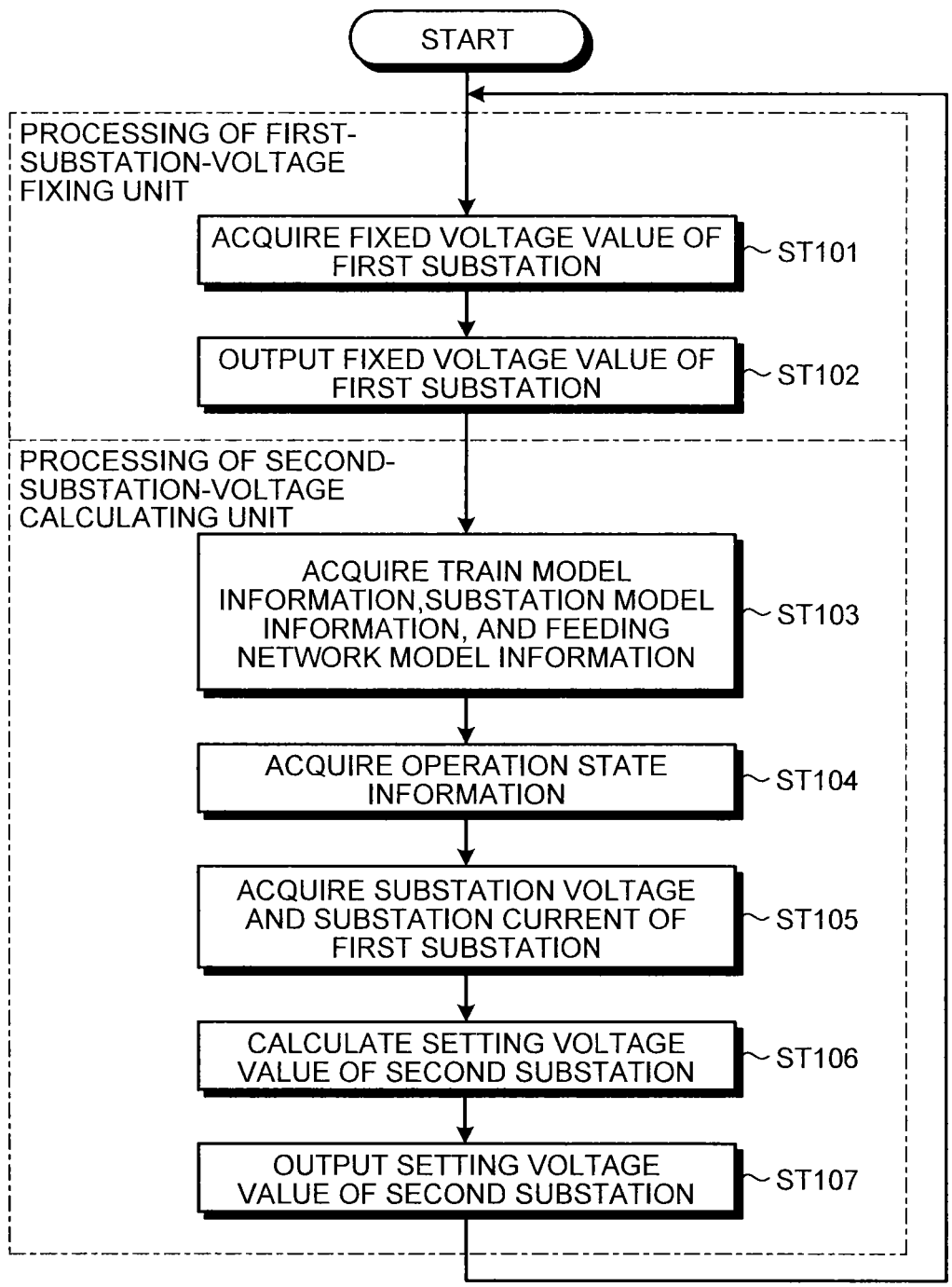
FIG. 5 is a flowchart illustrating an example of DC feeder voltage control processing in the DC feeder voltage control apparatus according to the first embodiment.

DC feeder voltage control processing in the DC feeder voltage control apparatus 100 according to the present embodiment is explained with reference to FIG. 1 and FIG. 5. FIG. 5 is a flowchart illustrating an example of the DC feeder voltage control processing in the DC feeder voltage control apparatus according to the first embodiment.

The first-substation-voltage fixing unit 3 acquires the fixed voltage values of the first substations 4 stored in the fixed-voltage-value storing unit 2 (step ST101) and outputs the acquired fixed voltage values of the first substations 4 to the first substations 4 (step ST102).

The second-substation-voltage calculating unit 5 acquires the train model information, the substation model information, and the feeding network model information stored in the model-information storing unit 1 (step ST103), acquires the operation state information acquired by the train-operation-state-information acquiring unit 6 (step ST104), and acquires substation voltages and substation currents from the first substations 4 (step ST105). The second-substation-voltage calculating unit 5 calculates a setting voltage value of the second substation 7 on the basis of the acquired train model information, substation model information, feeding network model information, operation state information, and substation voltages and substation currents of the first substations 4 (step ST106) and outputs the setting voltage value to the second substation 7 (step ST107).

The processing returns to the processing at step ST101. The processing at step ST101 to step ST108 is repeatedly carried out.

By carrying out the processing explained above, it is possible to perform control using only the positions of the trains present in the control section, the states of the trains, and the like without being affected by the positions, states, and the like of the trains present outside the control section. It is possible to effectively utilize the regenerative power irrespective of the sizes of the route and the feeding network.

As explained above, with the DC feeder voltage control apparatus and the DC feeder voltage control system in the first embodiment, the section between the predetermined two substations, between which at least one substation is located, is set as the control section, the substation voltages of the first substations at both the ends of the control section are controlled such that they are fixed at the fixed voltage values stored in the fixed-voltage-value storing unit 2, the setting voltage value of the second substation between the first substations is calculated on the basis of the train model information, the substation model information, and the feeding network model information stored in the model-information storing unit, the operation state information acquired by the train-operation-state-information acquiring unit 6, and the substation voltages and the substation currents of the first substations 4, and the substation voltage of the second substation is controlled such that it becomes the setting voltage value output from the second-substation-voltage calculating unit 5. Therefore, it is possible to perform control using only the positions of the trains present in the control section, the states of the trains, and the like without being affected by the positions, states, and the like of the trains present outside the control section. It is possible to effectively utilize the regenerative power irrespective of the sizes of the route and the feeding network.

Second Embodiment

Figure 6:
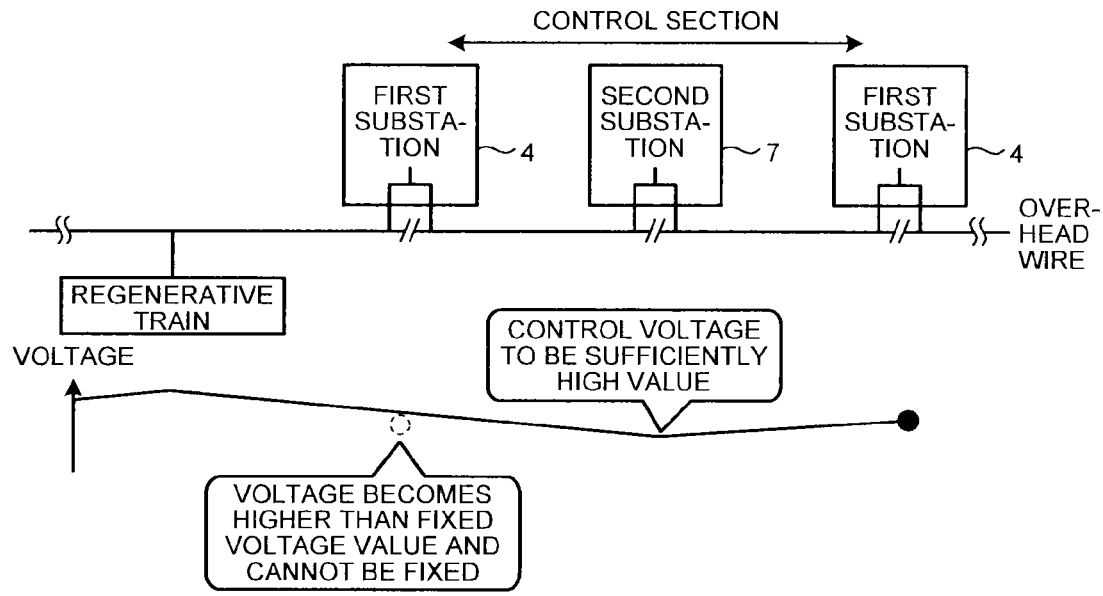
FIG. 6 is a diagram of an operation example of a DC feeder voltage control apparatus according to a second embodiment.

FIG. 6 is a diagram of an operation example of a DC feeder voltage control apparatus according to a second embodiment. Note that the configuration of the DC feeder voltage control apparatus according to the second embodiment is the same as the configuration of the DC feeder voltage control apparatus according to the first embodiment. Therefore, explanation of the configuration is omitted.

As shown in FIG. 6, when a regenerative train approaches around the first substation 4 outside the control section and the overhead wire voltage rises, even if the first substation 4 is a substation in which a thyristor element and PWM control are used, the substation voltage cannot be controlled such that it becomes a fixed voltage value (a broken line circle in the figure). In this case, when the overhead wire voltage in the control section is reduced, the overhead wire voltage outside the control section fluctuates. In other words, when control for reducing the substation voltage of the second substation 7 is carried out, in some case, necessary electric power cannot be supplied to a train running outside the control section. Therefore, in the present embodiment, when the regenerative train approaches around the first substation 4 outside the control section, the overhead wire voltage rises, and the substation voltage of the first substation 4 cannot be controlled such that it is fixed at the fixed voltage value, the substation voltage of the second substation 7 is controlled such that it becomes a sufficiently high value. Consequently, it is possible to supply necessary electric power to the train running outside the control section.

Therefore, in the present embodiment, when the second-substation-voltage calculating unit 5 acquires substation voltages and substation currents from the first substations 4, when the second-substation-voltage calculating unit 5 detects that at least one of the substation voltages of the first substations 4 exceeds the fixed voltage value thereof by a predetermined amount or more or at least one of the substation currents of the first substations 4 becomes substantially zero, the second-substation-voltage calculating unit 5 determines that the first substation 4 cannot control the substation voltage such that it becomes the fixed voltage value and sets the setting voltage value of the second substation 7 to a sufficiently high value.

By performing such control, when the regenerative train approaches around the first substation 4 outside the control section, the overhead wire voltage rises, and the substation voltage of the first substation 4 cannot be controlled such that it becomes the fixed voltage value, it is possible to prevent a situation in which the overhead wire voltage in the control section falls, the overhead wire voltage outside the control section fluctuates, and necessary electric power cannot be supplied to the train running outside the control section.

Figure 11:
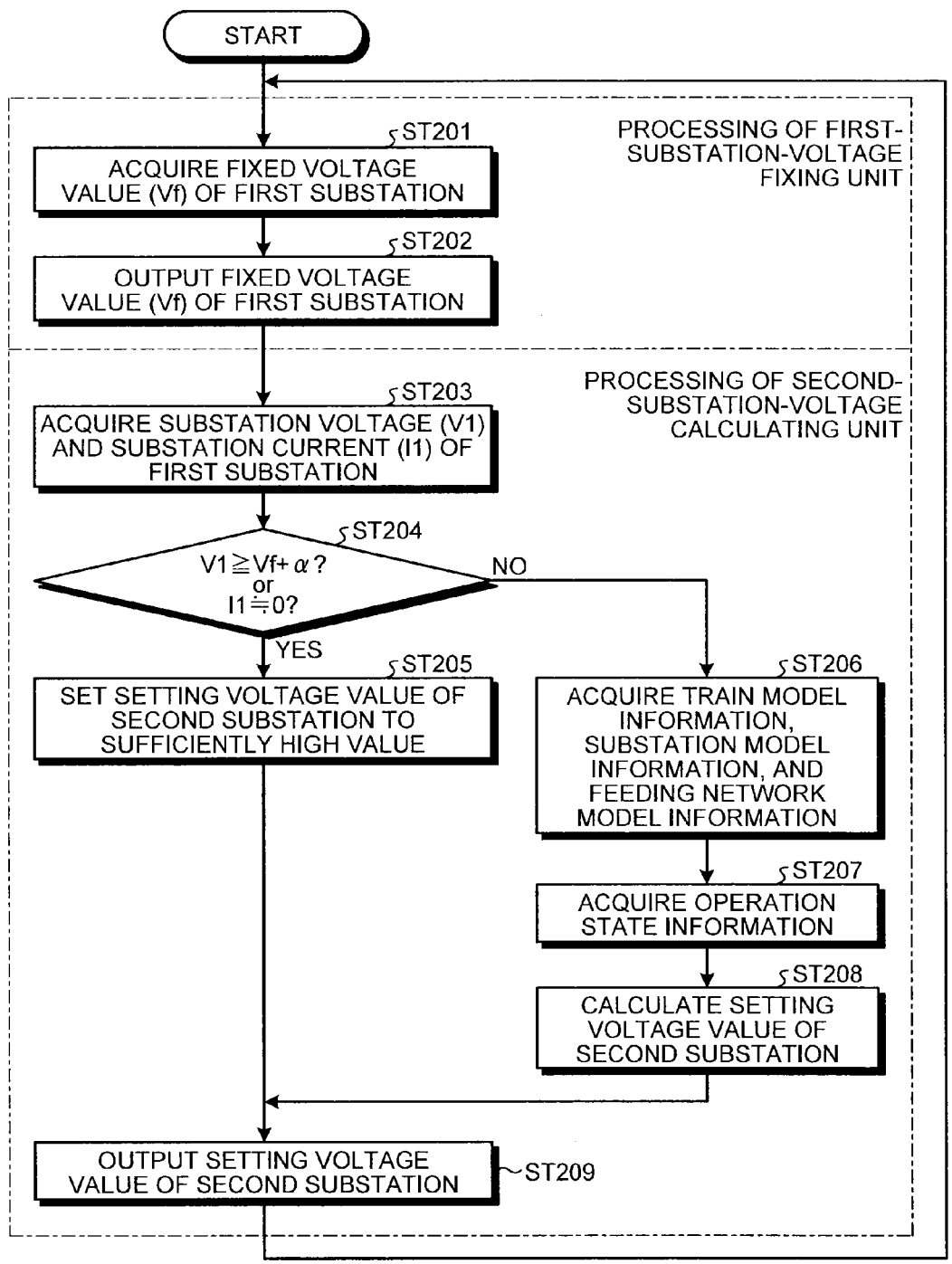
FIG. 11 is a flowchart illustrating an example of a DC feeder voltage control processing in the DC feeder voltage control apparatus according to the second embodiment.

DC feeder voltage control processing in the DC feeder voltage control apparatus 100 according to the present embodiment is explained with reference to FIG. 1 and FIG. 11. FIG. 11 is a flowchart illustrating an example of the DC feeder voltage control processing in the DC feeder voltage control apparatus according to the second embodiment.

The first-substation-voltage fixing unit 3 acquires fixed voltage values (Vf) of the first substations 4 stored in the fixed-voltage-value storing unit 2 (step ST201) and outputs the acquired fixed voltage values (Vf) of the first substations 4 to the first substations 4 (step ST202).

The second-substation-voltage calculating unit 5 acquires substation voltages and substation currents (I1) from the first substations 4 (step ST203). The second-substation-voltage calculating unit 5 determines whether at least one of the substation voltages of the first substations 4 exceeds a fixed voltage value thereof by a predetermined amount (a) or more (V1≥Vf+α) or at least one of the substation currents of the first substations 4 becomes substantially zero (I1≈0) (step ST204).

When V1≥Vf+α or I1≈0 is satisfied (Yes at step ST204), the second-substation-voltage calculating unit 5 sets the setting voltage value of the second substation 7 to a sufficiently high value (step ST205) and outputs the setting voltage value to the second substation 7 (step ST209). In contrast, when V1≥Vf+α or I1≈0 is not satisfied (No at step ST204), the second-substation-voltage calculating unit 5 acquires the train model information, the substation model information, and the feeding network model information stored in the model-information storing unit 1 (step ST206) and acquires the operation state information acquired by the train-operation-state-information acquiring unit 6 (step ST207), and furthermore, the second-substation-voltage calculating unit 5 calculates a setting voltage value of the second substation 7 on the basis of the acquired train model information, substation model information, feeding network model information, operation state information, and substation voltages and substation currents of the first substations 4 (step ST208) and outputs the setting voltage value to the second substation 7 (step ST209).

The processing returns to the processing at step ST201. The processing at step ST201 to step ST209 is repeatedly carried out.

By carrying out the processing explained above, even when the regenerative train approaches around the first substation 4 outside the control section, the overhead wire voltage rises, and the substation voltage of the first substation 4 cannot be controlled such that it becomes the fixed voltage value, it is possible to prevent a situation in which the overhead wire voltage in the control section falls, the overhead wire voltage outside the control section fluctuates, and necessary electric power cannot be supplied to the train running outside the control section.

As explained above, with the DC feeder voltage control apparatus and the DC feeder voltage control system in the second embodiment, when it is detected that at least one of the substation voltages of the first substations exceeds the fixed voltage value thereof by the predetermined amount or more or at least one of the substation currents of the first substations becomes substantially zero, it is determined that the first substation cannot control the substation voltage to the fixed voltage value, and the substation voltage of the second substation is controlled such that it becomes a sufficiently high value. Therefore, even when the regenerative train approaches around the first substation outside the control section, the overhead wire voltage rises, and the substation voltage of the first substation cannot be controlled such that it becomes the fixed voltage value, it is possible to prevent a situation in which the overhead wire voltage in the control section falls, the overhead wire voltage outside the control section fluctuates, and necessary electric power cannot be supplied to the train running outside the control section.

Third Embodiment

In a third embodiment, a case is explained where the first substations include regenerative inverters and include a function of absorbing an inflow current to the first substations (hereinafter referred to as "power regenerating function").

Figure 7:
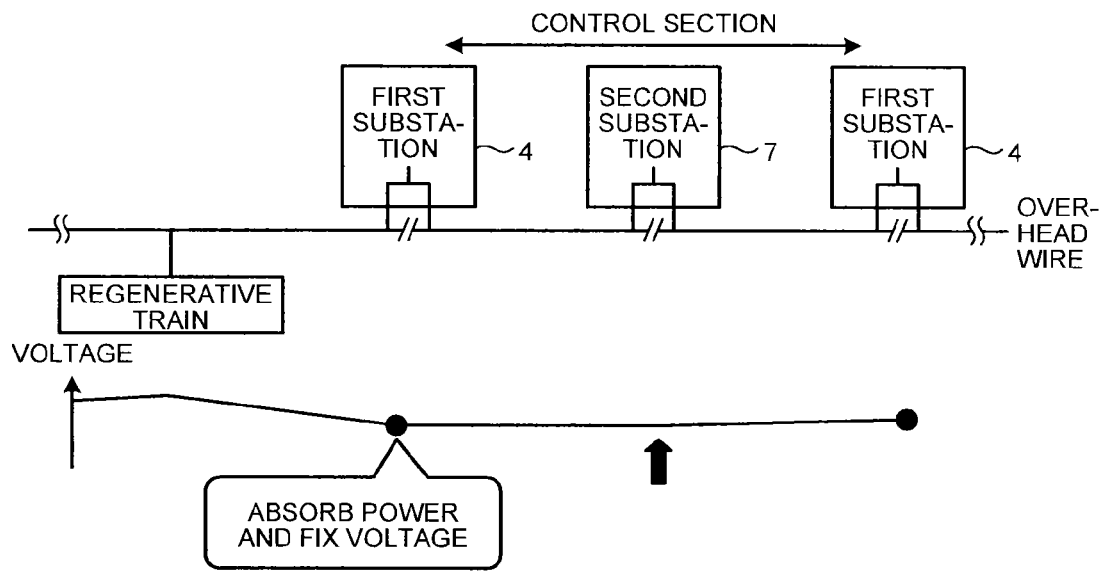
FIG. 7 is a diagram of an operation example of a DC feeder voltage control apparatus according to a third embodiment.

FIG. 7 is a diagram of an operation example of a DC feeder voltage control apparatus according to the third embodiment. Note that the configuration of the DC feeder voltage control apparatus according to the third embodiment is the same as the configuration of the DC feeder voltage control apparatuses according to the first embodiment and the second embodiment. Therefore, explanation of the configuration is omitted.

When the first substations 4 include the power regenerating function, as shown in FIG. 7, when a regenerative train approaches around the first substation 4 outside the control section, the first substation 4 absorbs the regenerative power of the regenerative train. Consequently, the substation voltage of the first substation 4 can be controlled such that it becomes a fixed voltage value. In other words, because the first substations 4 include the power regenerating function, even when the regenerative train approaches around the first substation 4 outside the control section, as in the first embodiment, it is possible to perform control using only the positions of the trains present in the control section, the states of the trains, and the like without being affected by the positions, states, and the like of the trains present outside the control section. It is possible to effectively utilize the regenerative power irrespective of the sizes of a route and a feeding network.

As explained above, with the DC feeder voltage control apparatus and the DC feeder voltage control system in the third embodiment, because the first substations include the power regenerating function, even when the regenerative train approaches around the first substation outside the control section, as in the first embodiment, it is possible to perform control using only the positions of the trains present in the control section, the states of the trains, and the like without being affected by the positions, states, and the like of the trains present outside the control section. It is possible to effectively utilize the regenerative power irrespective of the sizes of the route and the feeding network.

Fourth Embodiment

Figure 8:
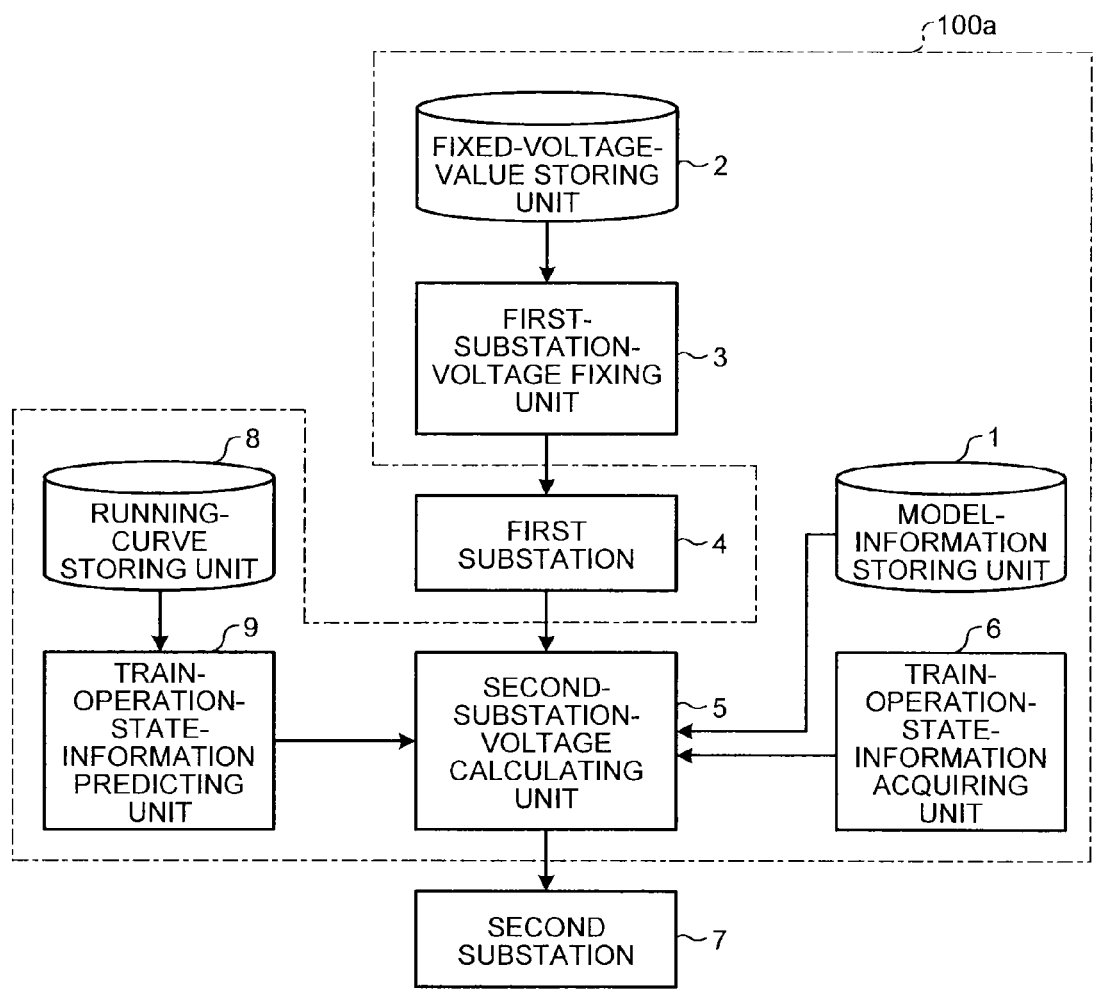
FIG. 8 is a diagram of a configuration example of a DC feeder voltage control apparatus according to a fourth embodiment.

FIG. 8 is a diagram of a configuration example of a DC feeder voltage control apparatus according to a fourth embodiment. Note that components same as or equivalent to the components in the first to third embodiments are denoted by the same reference numerals and signs and detailed explanation of the components is omitted.

A DC feeder voltage control apparatus 100a according to the fourth embodiment further includes, in addition to the components shown in FIG. 1 explained in the first embodiment, a running-curve storing unit 8 that stores a running curve of each of trains running in the control section and a train-operation-state-information predicting unit 9 that predicts, on the basis of the running curves, the positions of the trains running in the control section and the operation states of the trains including information concerning whether the trains are in power-running or in regeneration.

The second-substation-voltage calculating unit 5 supplements the operation state information acquired by the train-operation-state-information acquiring unit 6 with the operation states of the trains predicted by the train-operation-state-information predicting unit 9 and calculates a setting voltage value of the second substation 7. With such a configuration, even when the train-operation-state-information acquiring unit 6 fails in acquiring part of the operation state information or when the acquired operation state information is abnormal, with the use of the supplemented operation state information, it is possible to control the substation voltage of the second substation 7 using only the positions of the trains present in the control section, the states of the trains, and the like. It is possible to effectively utilize the regenerative power irrespective of the sizes of the route and the feeding network.

Figure 12:
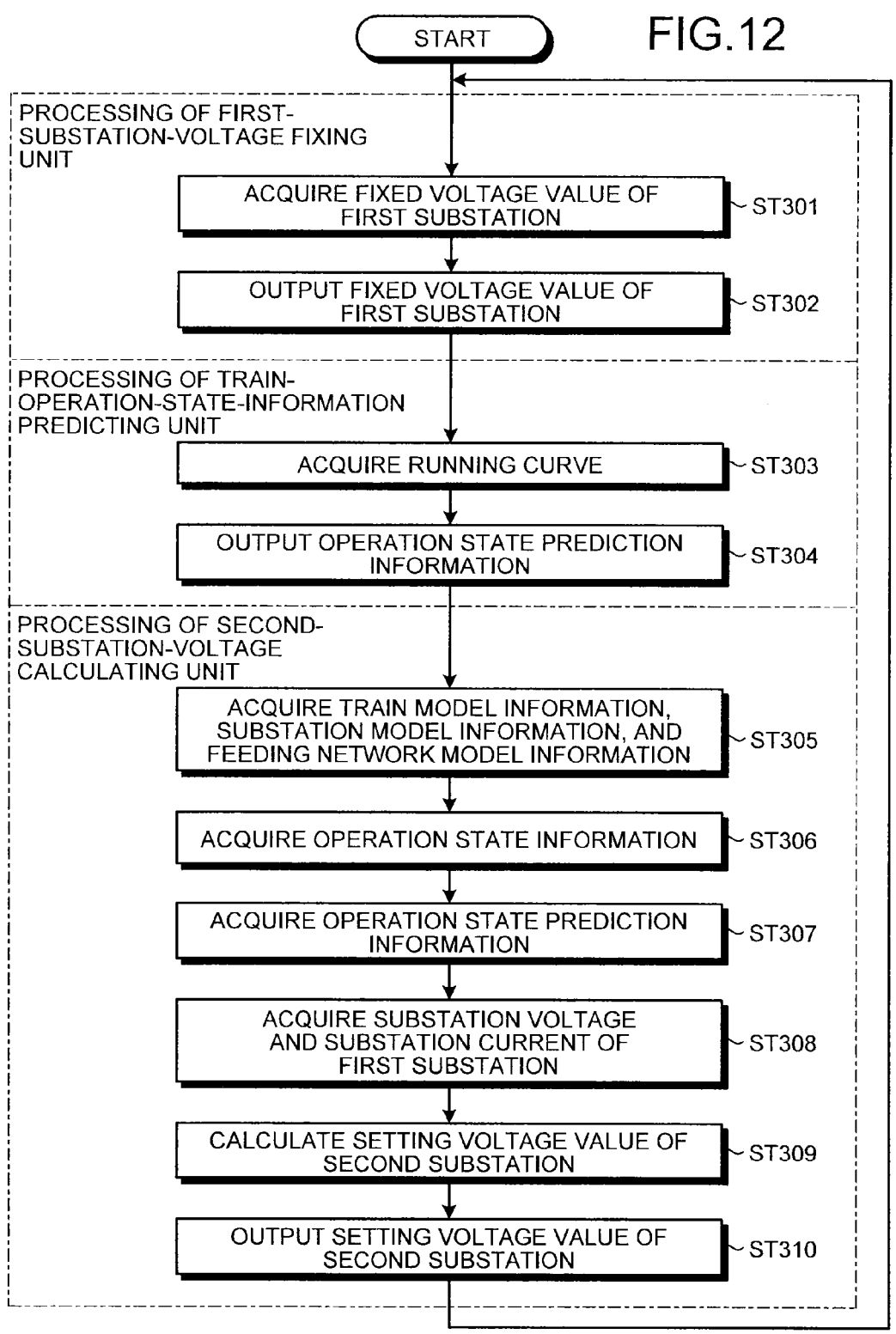
FIG. 12 is a flowchart illustrating an example of DC feeder voltage control processing in the DC feeder voltage control apparatus according to the fourth embodiment.

DC feeder voltage control processing in the DC feeder voltage control apparatus 100a according to the present embodiment is explained with reference to FIG. 1 and FIG. 12. FIG. 12 is a flowchart illustrating an example of the DC feeder voltage control processing in the DC feeder voltage control apparatus according to the fourth embodiment.

The first-substation-voltage fixing unit 3 acquires the fixed voltage values of the first substations 4 stored in the fixed-voltage-value storing unit 2 (step ST301) and outputs the acquired fixed voltage values of the first substations 4 to the first substations 4 (step ST302).

The train-operation-state-information predicting unit 9 acquires the running curves from the running-curve storing unit 8 (step ST303) and outputs prediction information on the train operation states of the trains to the second-substation-voltage calculating unit 5 (step ST304).

The second-substation-voltage calculating unit 5 acquires the train model information, the substation model information, and the feeding network model information stored in the model-information storing unit 1 (step ST305), acquires the operation state information acquired by the train-operation-state-information acquiring unit 6 (step ST306), and acquires the operation state prediction information from the train-operation-state-information predicting unit 9 (step ST307). Further, the second-substation-voltage calculating unit 5 acquires substation voltages and substation currents from the first substations 4 (step ST308), calculates a setting voltage value of the second substation 7 on the basis of the acquired train model information, substation model information, feeding network model information, operation state information, operation state prediction information, and substation voltages and substation currents of the first substations 4 (step ST309), and outputs the setting voltage value to the second substation 7 (step ST310).

The processing returns to the processing at step ST301. The processing at step ST301 to step ST310 is repeatedly carried out.

By carrying out the processing explained above, even when the train-operation-state-information acquiring unit fails in acquiring part of the operation state information or when the acquired operation state information is abnormal, with the use of the supplemented operation state information, it is possible to control the substation voltage of the second substation using only the positions of the trains present in the control section, the states of the trains, and the like. It is possible to effectively utilize the regenerative power irrespective of the sizes of the route and the feeding network.

As explained above, with the DC feeder voltage control apparatus and the DC feeder voltage control system in the fourth embodiment, the DC feeder voltage control apparatus further includes, in addition to the components explained in the first embodiment, the running-curve storing unit that stores a running curve of each of the trains running in the control section and the train-operation-state-information predicting unit that predicts, on the basis of the running curves, the positions of the trains running in the control section and the operation states of the trains including information concerning whether the trains are in power-running or in regeneration. The operation state information acquired by the train-operation-state-information acquiring unit is supplemented with the operation states of the trains predicted by the train-operation-state-information predicting unit and the substation voltage of the second substation is controlled. Therefore, even when the train-operation-state-information acquiring unit fails in acquiring part of the operation state information or when the acquired operation state information is abnormal, with the use of the supplemented operation state information, it is possible to control the substation voltage of the second substation using only the positions of trains present in the control section, the states of the trains, and the like. It is possible to effectively utilize the regenerative power irrespective of the sizes of the route and the feeding network.

Fifth Embodiment

Figure 13:
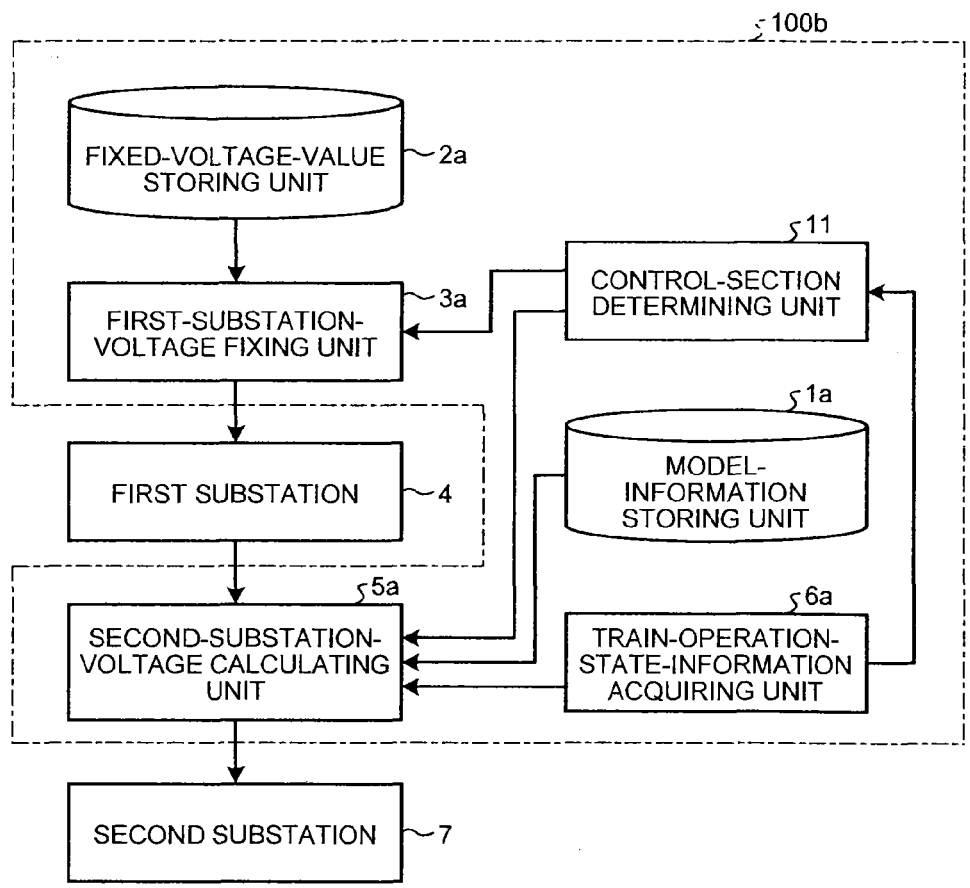
FIG. 13 is a diagram of a configuration example of a DC feeder voltage control apparatus according to a fifth embodiment.

FIG. 13 is a diagram of a configuration example of a DC feeder voltage control apparatus according to a fifth embodiment. Note that components same as or equivalent to the components in the first to third embodiments are denoted by the same reference numerals and signs and detailed explanation of the components is omitted.

A DC feeder voltage control apparatus 100b according to the fifth embodiment further includes, in addition to the components shown in FIG. 1 explained in the first embodiment, a control-section determining unit 11 that dynamically determines, on the basis of the operation state information acquired by a train-operation-state-information acquiring unit 6a, the control section formed by the first substations 4 that fix the substation voltages and the second substation 7 that controls the substation voltage.

A model-information storing unit 1a stores train model information on each of the trains running in a predetermined section extending in one route or across a plurality of routes, substation model information on each of the substations in the predetermined section, and feeding network model information in the predetermined section.

A fixed-voltage-value storing unit 2a stores a fixed voltage value of a substation voltage set for each of the substations in the predetermined section.

The train-operation-state-information acquiring unit 6a acquires the positions of the trains running in the predetermined section and operation state information including the operation states of the trains including information concerning whether the trains are in power-running or in regeneration.

In the predetermined section, when the train-operation-state-information acquiring unit 6a cannot normally acquire the operation state information on some trains, the control-section determining unit 11 sets, as a non-control section, a section between the substations where the trains are present and sets, as a control section, a section other than the non-control section, that is, a section where the operation state information on all the trains present between the substations can be acquired. Note that, even when the operation state information cannot be normally acquired, by using an operation management system or the like, it is possible to easily acquire information concerning whether trains are present between the substations.

Figure 14:
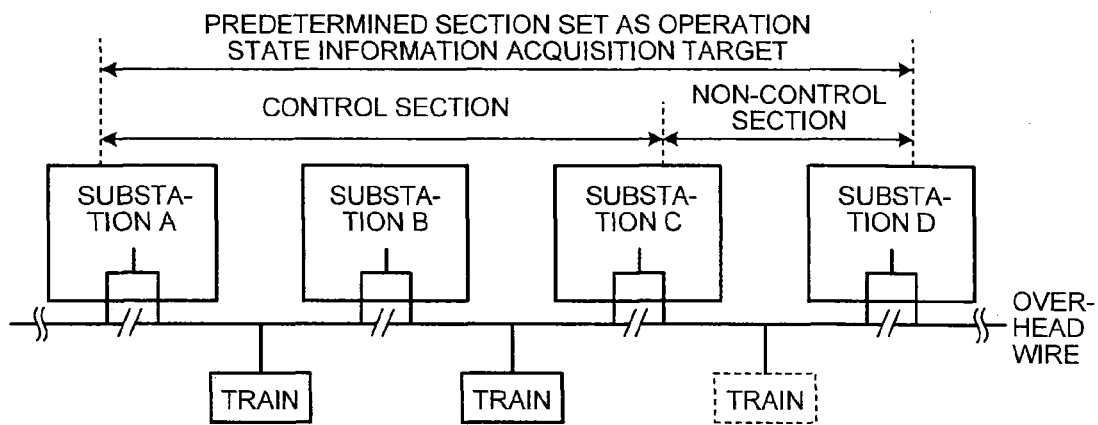
FIG. 14 is a diagram of an example of a control section determined by a control-section determining unit in a DC feeder voltage control apparatus according to the fifth embodiment.

FIG. 14 is a diagram of an example of the control section determined by the control-section determining unit 11 in the DC feeder voltage control apparatus according to the fifth embodiment. In FIG. 14, a train surrounded by a broken line is a train, the operation state information of which cannot be normally acquired. In the example shown in FIG. 14, the section between substations A to D is set as a predetermined section where trains are operation state information acquisition targets. Because the operation state information on the trains in the section between the substations C and D cannot be normally acquired, the section between the substations C and D is set as a non-control section. The section between the substations A and C where the operation state information on all the trains can be acquired is set as a control section. In this case, the substations A and C are assigned as the first substations 4. The substation B is assigned as the second substation 7. By dynamically determining the control section in this way, even when the train-operation-state-information acquiring unit 6a fails in acquiring the operation state information on part of the trains in the predetermined section or when the acquired operation state information is abnormal, it is possible to appropriately set the control section and control the substation voltage of the second substation 7. It is possible to effectively utilize regenerative power.

Here the description refers back to FIG. 13. A first-substation-voltage fixing unit 3a outputs the fixed voltage value stored in the control-section-fixed-voltage-value storing unit 2a to the first substation 4 assigned by the control-section determining unit 11.

The second-substation-voltage calculating unit 5a calculates a setting voltage value of a substation voltage in the second substation 7 on the basis of the train model information, the substation model information, and the feeding network model information stored in the model-information storing unit 1a, the operation state information acquired by the train-operation-state-information acquiring unit 6, and substation voltages and substation currents of the first substations 4 and outputs the setting voltage value to the second substation 7 assigned by the control-section determining unit 11.

Figure 15:
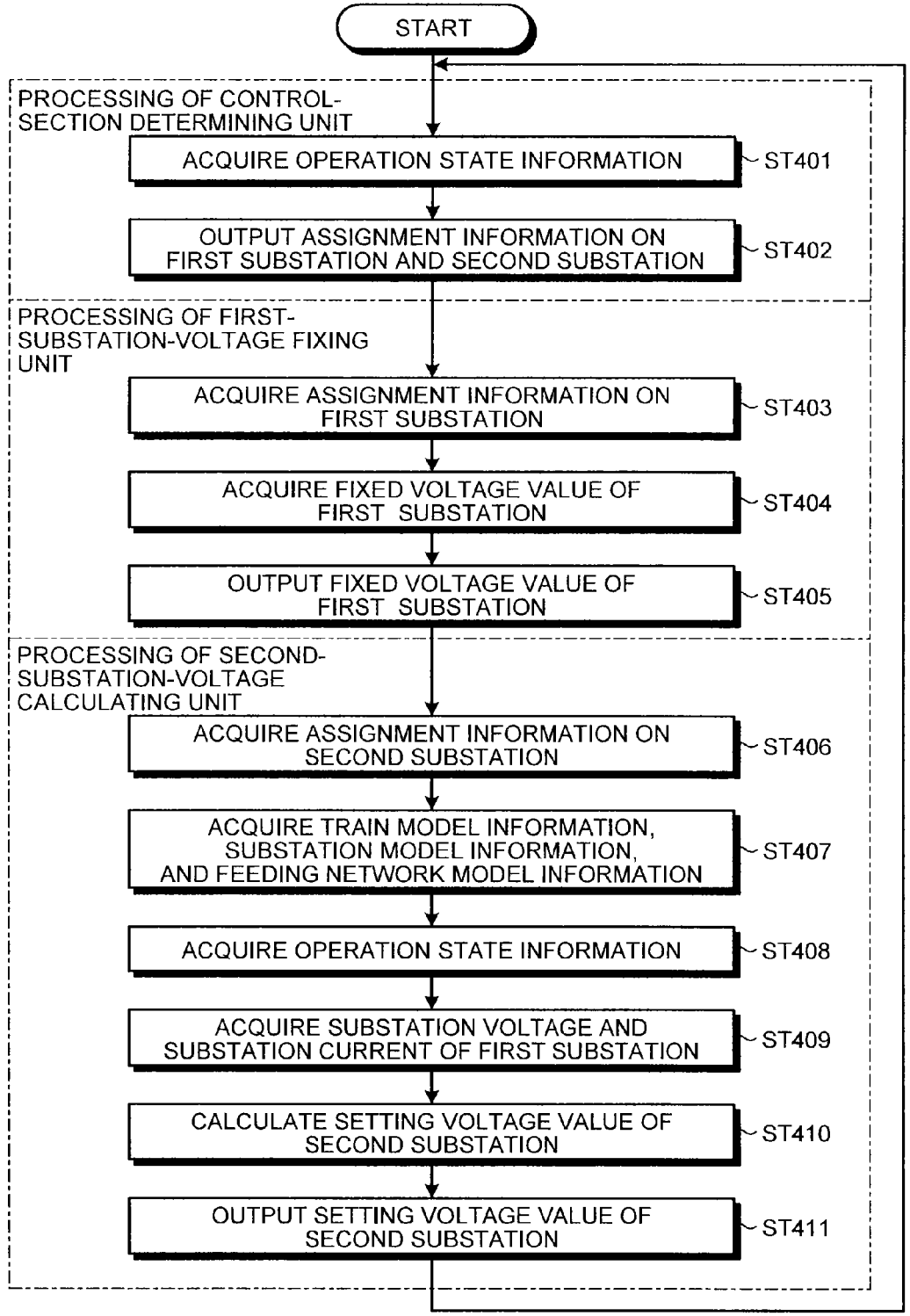
FIG. 15 is a flowchart illustrating an example of DC feeder voltage control processing in the DC feeder voltage control apparatus according to the fifth embodiment.

DC feeder voltage control processing in the DC feeder voltage control apparatus 100b according to the present embodiment is explained with reference to FIG. 13 and FIG. 15. FIG. 15 is a flowchart illustrating an example of the DC feeder voltage control processing in the DC feeder voltage control apparatus according to the fifth embodiment.

The control-section determining unit 11 acquires the operation state information acquired by the train-operation-state-information acquiring unit 6a (step ST401), determines the control section in the predetermined section on the basis of the operation state information, assigns the first substations 4 and the second substation 7, and outputs information concerning the assignment to the first-substation-voltage fixing unit 3a and second-substation-voltage calculating unit 5a (step ST402).

The first-substation-voltage fixing unit 3a acquires the assignment information on the first substations 4 from the control-section determining unit 11 (step ST403), acquires the fixed voltage values of the first substations 4 stored in the fixed-voltage-value storing unit 2 (step ST404), and outputs the acquired fixed voltage values of the first substations 4 to the first substations 4 (step ST405).

The second-substation-voltage calculating unit 5a acquires the assignment information on the second substation 7 from the control-section determining unit 11 (step ST406), acquires the train model information, the substation model information, and the feeding network model information stored in the model-information storing unit 1a (step ST407), acquires the operation state information acquired by the train-operation-state-information acquiring unit 6 (step ST408), and acquires substation voltages and substation currents from the first substations 4 (step ST409). The second-substation-voltage calculating unit 5a calculates a setting voltage value of the second substation 7 on the basis of the acquired train model information, substation model information, feeding network model information, operation state information, and substation voltages and substation currents of the first substations 4 (step ST410) and outputs the setting voltage value to the second substation 7 (step ST411).

The processing returns to step ST401. The processing at step ST401 to step ST411 is repeatedly carried out.

By carrying out the processing explained above, even when the train-operation-state-information acquiring unit fails in acquiring part of the operation state information or when the acquired operation state information is abnormal, it is possible to appropriately set the control section and control the substation voltage of the second substation. It is possible to effectively utilize the regenerative power irrespective of the sizes of the route and the feeding network.

As explained above, with the DC feeder voltage control apparatus and the DC feeder voltage control system in the fifth embodiment, the DC feeder voltage control apparatus further includes, in addition to the components explained in the first embodiment, the control-section determining unit that dynamically determines, on the basis of the operation state information acquired by the train-operation-state-information acquiring unit, the control section formed by the first substations that fix the substation voltages and the second substation that controls the substation voltage. When the train-operation-state-information acquiring unit cannot normally acquire the operation state information on some trains in a predetermined section extending in one route or across a plurality of routes, the control-section determining unit performs processing for setting, as a non-control section, a section between the substations where the trains are present and setting, as a control section, a section other than the non-control section. Therefore, even when the train-operation-state-information acquiring unit fails in acquiring the operation state information on part of the trains in the predetermined section or when the acquired operation state information is abnormal, it is possible to appropriately set the control section and control the substation voltage of the second substation. It is possible to effectively utilize regenerative power irrespective of the sizes of the route and the feeding network.

Note that, in the fifth embodiment, as explained in the second embodiment, it is also possible that, when it is detected that at least one of the substation voltages of the first substations exceeds the fixed voltage value thereof by a predetermined amount or more or at least one of the substation currents of the first substations becomes substantially zero, it is determined that the first substation cannot control the substation voltage such that it becomes the fixed voltage value, and the substation voltage of the second substation is controlled such that it becomes a sufficiently high value. It goes without saying that, as in the second embodiment, even when the regenerative train approaches around the first substation outside the control section, the overhead wire voltage rises, and the substation voltage of the first substation cannot be controlled to the fixed voltage value, it is possible to prevent a situation in which the overhead wire voltage in the control section falls, the overhead wire voltage outside the control section fluctuates, and necessary electric power cannot be supplied to the train running outside the control section.

In the fifth embodiment, as explained in the third embodiment, the first substations can include the power regenerating function. It goes without saying that, even when the regenerative train approaches around the first substation outside the control section, as in the third embodiment, it is possible to perform control using only the positions of the trains present in the control section, the states of the trains, and the like without being affected by the positions, states, and the like of the trains present outside the control section.

The configurations explained in the embodiments are examples of the configuration of the present invention. It goes without saying that the configurations can be combined with other publicly-known technologies or a part of the configurations can be changed to, for example, omit a part thereof without departing from the spirit of the present invention.

REFERENCE SIGNS LIST 1, 1a model-information storing unit, 2, 2a fixed-voltage-value storing unit, 3, 3a first-substation-voltage fixing unit, 4 first substation, 5, 5a second-substation-voltage calculating unit, 6, 6a train-operation-state-information acquiring unit, 7 second substation, 8 running-curve storing unit, 9 train-operation-state-information predicting unit, 10 network, 11 control-section determining unit, 100, 100a, 100b DC feeder voltage control apparatus.

The invention claimed is:

1. A DC feeder voltage control apparatus that controls a substation voltage, which is a voltage at a connection point to an overhead wire, in substations in a predetermined control section in a direct-current electrified section of an electric railway, the apparatus comprising:
   a model-information storing unit that stores train model information on each of trains running in the control section, substation model information on each of the substations, and feeding network model information in the control section;
   a fixed-voltage-value storing unit that stores a fixed voltage value of the substation voltage set for each of the substations;
   a train-operation-state-information acquiring unit that acquires a position of each of the trains running in the control section and operation state information on each of the trains including information concerning whether the trains are in power-running or in regeneration;
   a first-substation-voltage fixing unit that outputs the fixed voltage value to each of two first substations located at both ends of the control section; and
   a second-substation-voltage calculating unit that calculates a setting voltage value of the substation voltage in at least one second substation located between the two first substations on a basis of the train model information, the substation model information, the feeding network model information, the operation state information, the substation voltages of the first substations, and substation currents flowing out to an overhead wire from the first substations, and outputs the setting voltage value to the second substation.

2. The DC feeder voltage control apparatus according to claim 1, wherein, when the second-substation-voltage calculating unit detects that at least one of the two first substations is not capable of controlling the substation voltage such that it becomes the fixed voltage value, the second-substation-voltage calculating unit sets the setting voltage value to a sufficiently high value.

3. The DC feeder voltage control apparatus according to claim 2, wherein, when the substation voltage of the first substation exceeds the fixed voltage value by a predetermined amount or more, the second-substation-voltage calculating unit determines that the first substation is not capable of controlling the substation voltage such that it becomes the fixed voltage value.

4. The DC feeder voltage control apparatus according to claim 2, wherein, when the substation current of the first substation becomes substantially zero, the second-substation-voltage calculating unit determines that the first substation is not capable of controlling the substation voltage such that it becomes the fixed voltage value.

5. The DC feeder voltage control apparatus according to claim 1, further comprising:
  a running-curve storing unit that stores a running curve of each of the trains running in the control section; and
  a train-operation-state-information predicting unit that predicts, on a basis of the running curve, a position of each of the trains running in the control section and an operation state of each of the trains including information concerning whether the trains are in power-running or in regeneration, wherein
  the second-substation-voltage calculating unit supplements the operation state information with the operation state of each of the trains predicted by the train-operation-state-information predicting unit and calculates the setting voltage value.

6. A DC feeder voltage control apparatus that controls a substation voltage, which is a voltage at a connection point to an overhead wire, in substations in a predetermined section in a direct-current electrified section of an electric railway, the apparatus comprising:
  a model-information storing unit that stores train model information on each of trains running in the predetermined section, substation model information on each of the substations, and feeding network model information in the predetermined section;
  a fixed-voltage-value storing unit that stores a fixed voltage value of the substation voltage set for each of the substations;
  a train-operation-state-information acquiring unit that acquires a position of each of the trains running in the predetermined section and operation state information on each of the trains including information concerning whether the trains are in power-running or in regeneration;
  a control-section determining unit that dynamically determines a control section in the predetermined section on a basis of the operation state information;
  a first-substation-voltage fixing unit that outputs the fixed voltage value to each of two first substations located at both ends of the control section; and
  a second-substation-voltage calculating unit that calculates a setting voltage value of the substation voltage in at least one second substation located between the two first substations on a basis of the train model information, the substation model information, the feeding network model information, the operation state information, the substation voltages of the first substations, and substation currents flowing out to an overhead wire from the first substations, and outputs the setting voltage value to the second substation.

7. The DC feeder voltage control apparatus according to claim 6, wherein the control-section determining unit determines, as the control section, a section other than a section where a train, the operation state information of which is not capable of being acquired by the train-operation-state-information acquiring unit, is present in the predetermined section.

8. The DC feeder voltage control apparatus according to claim 6, wherein, when the second-substation-voltage calculating unit detects that at least one of the two first substations is not capable of controlling the substation voltage such that it becomes the fixed voltage value, the second-substation-voltage calculating unit sets the setting voltage value to a sufficiently high value.

9. The DC feeder voltage control apparatus according to claim 8, wherein, when the substation voltage of the first substation exceeds the fixed voltage value by a predetermined amount or more, the second-substation-voltage calculating unit determines that the first substation is not capable of controlling the substation voltage such that it becomes the fixed voltage value.

10. The DC feeder voltage control apparatus according to claim 8, wherein, when the substation current of the first substation becomes substantially zero, the second-substation-voltage calculating unit determines that the first substation is not capable of controlling the substation voltage such that it becomes the fixed voltage value.

11. A DC feeder voltage control system comprising:
  the DC feeder voltage control apparatus according to claim 6;
  the two first substations; and
  at least one second substation.

12. The DC feeder voltage control system according to claim 11, wherein the first substation absorbs an inflow current to the first substation to prevent the substation voltage from exceeding the fixed voltage value.

13. A DC feeder voltage control system comprising:
  the DC feeder voltage control apparatus according to claim 1;
  the two first substations; and
  at least one second substation.

14. The DC feeder voltage control system according to claim 13, wherein the first substation absorbs an inflow current to the first substation to prevent the substation voltage from exceeding the fixed voltage value.

* * * * *